US006896985B2

United States Patent
Horiguchi et al.

(10) Patent No.: US 6,896,985 B2
(45) Date of Patent: May 24, 2005

(54) FUEL CELL SYSTEM

(75) Inventors: Munehisa Horiguchi, Tokyo (JP); Taizo Yamamoto, Tokyo (JP); Masataka Ueno, Tokyo (JP); Kenji Kato, Tokyo (JP); Hideto Miyazaki, Tokyo (JP)

(73) Assignee: Kabushiki Kaisha Equos Research (JP)

( * ) Notice: Subject to any disclaimer, the term of this patent is extended or adjusted under 35 U.S.C. 154(b) by 337 days.

(21) Appl. No.: 10/229,043

(22) Filed: Aug. 28, 2002

(65) Prior Publication Data
US 2003/0059656 A1 Mar. 27, 2003

(30) Foreign Application Priority Data
Sep. 27, 2001 (JP) ........................................ 2001-297000

(51) Int. Cl.[7] .............................................. H01M 8/04
(52) U.S. Cl. ............................. 429/22; 429/17; 429/23; 429/34
(58) Field of Search ............................. 429/17, 22, 34, 429/23

(56) References Cited
U.S. PATENT DOCUMENTS
2002/0136942 A1 * 9/2002 Kashiwagi ................... 429/34
2003/0012993 A1 * 1/2003 Katagiri et al. ............... 429/26
2003/0039869 A1 * 2/2003 Murakami et al. ............ 429/13

FOREIGN PATENT DOCUMENTS
JP 08-124588 5/1996

* cited by examiner

Primary Examiner—John S. Maples
(74) Attorney, Agent, or Firm—Lorusso & Loud

(57) ABSTRACT

There is provided a fuel cell system which is efficient and does not cause reduction in output even when operation and stopping of a fuel cell are repeated for a long period of time. The fuel cell system is provided with a fuel cell stack including a fuel chamber for supplying a hydrogen gas to a hydrogen electrode and an oxygen chamber for supplying air to an oxygen electrode. The system is provided with gas supply ports for supplying the hydrogen gas into the fuel chamber, gas discharge ports for discharging the hydrogen gas from the fuel chamber, a hydrogen suction pump and the like for sucking the hydrogen gas from the gas discharge ports, a hydrogen circulation pipe and the like for interconnecting the gas discharge ports and the gas supply ports through the hydrogen suction pump and the like, and a first hydrogen discharge pipe and the like for interconnecting the gas discharge ports and an outside gas release port through the hydrogen suction pump and the like.

26 Claims, 12 Drawing Sheets

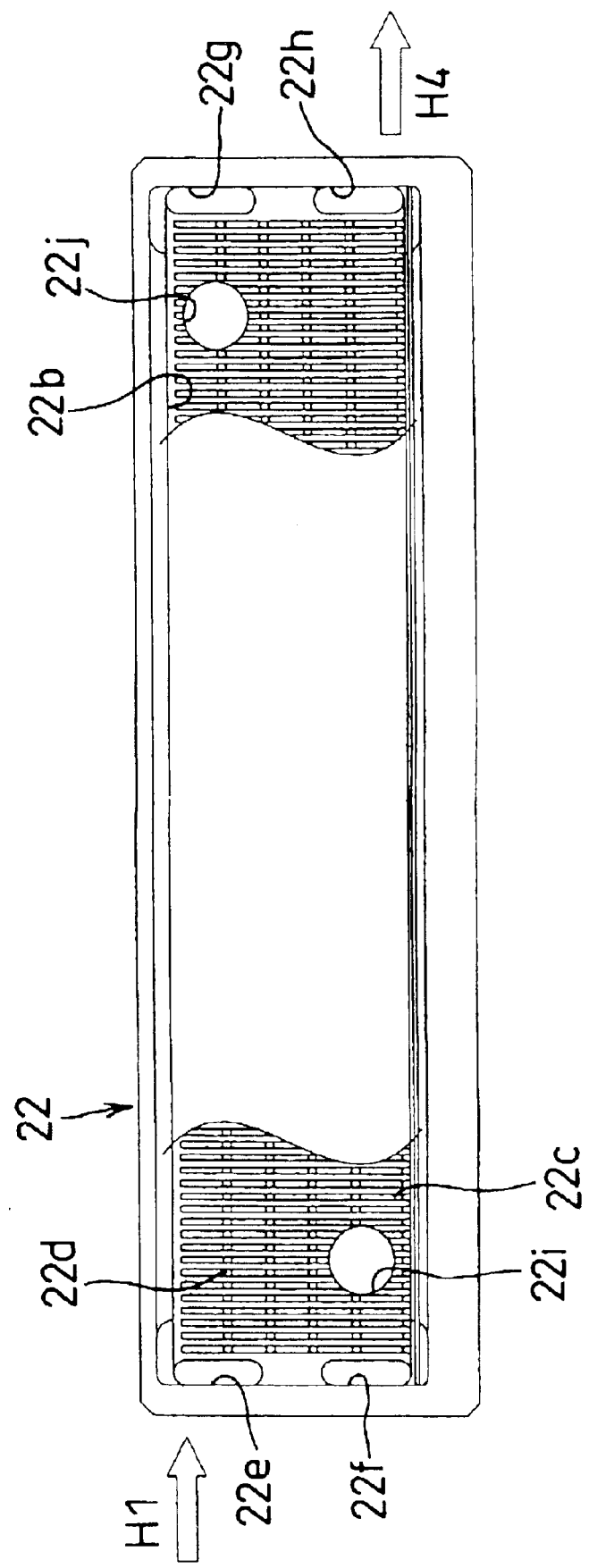

FUEL CELL SYSTEM

BACKGROUND OF THE INVENTION

1. Field of the Invention

The present invention relates to a fuel cell system provided with a fuel cell. This fuel cell system is suitable for use in a traveling power source of an electric vehicle or the like, or a stationary power source.

2. Description of the Related Art

As the fuel cell, there are a phosphoric acid fuel cell, a fused carbonate fuel cell, a solid-electrolyte fuel cell, an alkaline fuel cell, and a polymer electrolyte fuel cell. For example, the polymer electrolyte fuel cell (PEFC) includes a hydrogen electrode (anode electrode) to which a gas containing hydrogen is supplied, an oxygen electrode (cathode electrode) to which an oxygen gas containing oxygen, such as air, is supplied, and a solid polymer film type electrolyte layer made of ion exchange resin held between the hydrogen electrode and the oxygen electrode. A catalyst such as platinum is supported in the electrolyte of the oxygen electrode and the electrolyte of the hydrogen electrode.

In these fuel cells, a fuel chamber for supplying hydrogen in the gas to the hydrogen electrode is formed, and a gas supply port for supplying the gas and a gas discharge port for discharging the gas are formed in the fuel chamber. Besides, in these fuel cells, an oxygen chamber for supplying oxygen in the oxygen gas to the oxygen electrode is formed, and an oxygen gas supply port for supplying the oxygen gas and an oxygen gas discharge port for discharging the oxygen gas are formed in the oxygen chamber.

In the fuel cell system provided with the fuel cell, the oxygen gas is supplied into the oxygen chamber of the fuel cell through the oxygen gas supply port, while the gas is supplied into the fuel chamber of the fuel cell through the gas supply portion, whereby a reaction of $$H_2 \rightarrow 2H^+ + 2e^-$$

takes place at the side of the hydrogen electrode. $H^+$ generated here moves in the form of $H_3O^+$ through the electrolyte layer, and a reaction of $$(\tfrac{1}{2})O_2 + 2H^+ + 2e^- \rightarrow H_2O$$

takes place at the side of the oxygen electrode. In this way, an electromotive force due to an electrochemical reaction of $$H_2 + (\tfrac{1}{2})O_2 \rightarrow H_2O$$

is obtained between the hydrogen electrode and the oxygen electrode. Besides, produced water is generated by this at the side of the oxygen electrode. Then, an exhaust gas in the oxygen chamber of the fuel cell in which oxygen is not consumed, together with the produced water and the like, is discharged from the oxygen gas discharge port, while the gas in the fuel chamber in which hydrogen is not consumed, together with the produced water and the like, is discharged from the gas discharge port.

Now, for example, immediately after stopping of the fuel cell, the hydrogen gas remains in the fuel chamber. In case this state is left as it is, air is mixed into the fuel chamber from the outside, and the hydrogen gas and the oxygen gas are mixed.

Besides, at the time of start-up of the fuel cell, the air exists in the fuel chamber, and when the hydrogen gas as the fuel is injected in this state, the hydrogen gas and the air (oxygen gas) are mixed. It is known that deterioration of a catalyst at the side of the oxygen electrode can occur by the mixture of the hydrogen gas and the oxygen gas.

Then, it is conceivable that a suction device for sucking a gas from the gas discharge port of the fuel chamber is provided, and the remaining gas is discharged to the outside of the fuel cell to prevent the mixture of the hydrogen gas and the oxygen gas.

In this case, there occurs a problem of how to construct the suction device and how to use it.

SUMMARY OF THE INVENTION

The present invention has been made in view of the foregoing conventional circumstances, and has an object to provide a fuel cell system in which a remaining gas can be simply and efficiently discharged.

According to an aspect of the invention, in a fuel cell system comprising a fuel cell including a fuel chamber for supplying hydrogen to a hydrogen electrode and an oxygen chamber for supplying oxygen to an oxygen electrode, the fuel cell system is characterized by comprising a gas supply port for supplying a gas into the fuel chamber, a gas discharge port for discharging the gas from the fuel chamber, a suction device for sucking the gas from the gas discharge port, a circulation passage for interconnecting the gas discharge port and the gas supply port through the suction device, and a release passage for interconnecting the gas discharge port and an outside gas release port through the suction device.

In the fuel cell system, the gas in the fuel chamber can be made to flow into the circulation passage or the release passage by the suction device. Thus, the suction device can be used for both circulation and release.

Besides, in the fuel cell system, since the suction device makes the gas flow into the circulation passage or the release passage, a device for only making the gas flow into the circulation passage, or a device for only making the gas flow into the release passage becomes unnecessary, and the contribution to space-saving and low cost is great.

It is preferable that the fuel cell system further comprises a switching device for switching between the circulation passage and the release passage. The switching device can switch whether the gas is made to flow into the circulation passage or the release passage.

The switching device selects the release passage at the time of start-up or stopping of the fuel cell, and can select the circulation passage at the time of operation of the fuel cell. At the time of start-up or stopping of the fuel cell, it is possible to discharge the remaining gas and to introduce a new gas. Besides, also at the time of operation, as the need arises, it is possible to switch the circulation passage to the release passage.

The outside gas release port does not reflux the gas sucked by the suction device into the fuel chamber, and for example, the gas may be released to the outside of the fuel cell as it is, or in the case where the gas to be released contains hydrogen, it may be released to the outside after catalyzed combustion. Besides, after moisture or water vapor is collected from the sucked gas, it can be released.

According to another aspect of the invention, in the fuel cell system comprising a fuel cell including a fuel chamber for supplying hydrogen to a hydrogen electrode and an oxygen chamber for supplying oxygen to an oxygen electrode, the fuel cell system is characterized by comprising a gas storage device for storing a gas containing the hydrogen, a gas supply port for supplying the gas into the fuel chamber, a gas discharge port for discharging the gas from the fuel chamber, a suction device for sucking the gas from the gas discharge port, and a control device. Here, the control device has a circulation mode for operating the suction device to reflux the gas sucked from the gas discharge port to the gas supply port, a discharge mode for operating the suction device to release the gas sucked from the gas discharge port to an outside gas release port, and a supply mode for supplying the gas from the gas storage device to the gas supply port.

In the fuel cell system, since the control device executes the circulation mode, the discharge mode, and the supply mode, as the need arises, it is possible to suck the gas remaining in the fuel chamber from the gas discharge port and to circulate it.

As the gas storage device, for example, a hydrogen cylinder containing liquefied hydrogen, a high pressure hydrogen tank, a methanol reforming device for generating a hydrogen-containing gas by methanol reforming, a tank containing a hydrogen storing alloy to release an occluded hydrogen gas, or the like can be adopted.

According to still another aspect of the invention, in a fuel cell system comprising a fuel cell including a fuel chamber for supplying hydrogen to a hydrogen electrode and an oxygen chamber for supplying oxygen to an oxygen electrode, the fuel cell system is characterized by comprising a gas storage device for storing a gas containing the hydrogen, a gas supply port for supplying the gas into the fuel chamber, a gas discharge port for discharging the gas from the fuel chamber, a suction device for sucking the gas from the gas discharge port, and a control device. Here, the control device releases the gas, which was sucked by the suction device from the gas discharge port, from an outside gas release port at the time of start-up of the fuel cell. The gas sucked from the gas discharge port in this way is apt to contain an oxygen gas or the like as impurities in addition to a gas containing hydrogen. Besides, at the time of operation of the fuel cell, the control device refluxes the gas sucked from the gas discharge port by the suction device to the gas supply port. Similarly to the other invention, the outside gas release port is such that the gas is not refluxed to the fuel chamber.

It is preferable that the fuel cell system further comprises an oxygen concentration sensor for detecting an oxygen concentration in the fuel chamber, and the control device judges, on the basis of the output of the oxygen concentration sensor, that the release of the gas to the outside gas release port is performed. If doing so, it is possible to certainly judge whether or not the gas, which is apt to contain an oxygen gas as an impurity when remaining in the fuel chamber, is released from the fuel chamber.

According to still another aspect of the invention, in a fuel cell system comprising a fuel cell including a fuel chamber for supplying hydrogen to a hydrogen electrode and an oxygen chamber for supplying oxygen to an oxygen electrode, the fuel cell system is characterized by comprising a gas storage device for storing a gas containing the hydrogen, a gas supply port for supplying the gas into the fuel chamber, a gas discharge port for discharging the gas from the fuel chamber, a suction device for sucking the gas from the gas discharge port, and a control device. Here, at the time of stopping of the fuel cell, the control device releases the gas, which was sucked from the gas discharge port by the suction device, from an outside gas release port. Besides, at the time of operation of the fuel cell, the control device refluxes the gas, which was sucked from the gas discharge port by the suction device, to the gas supply port. Similarly to the other invention, the outside gas release port signifies release to the outside of a reflux loop, and the gas is not refluxed into the fuel chamber, and for example, it is possible to release the gas into the atmosphere outside of the fuel cell.

It is preferable that at the time of stopping of the fuel cell, after the gas is released to the outside gas release port, the control device supplies air from the outside of the fuel cell into the fuel chamber. If doing so, since it is possible to substantially completely substitute air for the gas which is apt to contain an oxygen gas as an impurity when remaining in the fuel chamber, degradation of the oxygen electrode is mainly hard to promote.

Further, according to still another aspect of the invention, in a fuel cell system comprising a fuel cell including a fuel chamber for supplying hydrogen to a hydrogen electrode and an oxygen chamber for supplying oxygen to an oxygen electrode, the fuel cell system is characterized by comprising a gas supply port for supplying a gas containing the hydrogen into the fuel chamber, a gas discharge port for discharging the gas from the fuel chamber, a suction device for sucking the gas from the gas discharge port, concentration detection means attached in the fuel chamber, for detecting a concentration of the gas in the fuel chamber, and a control device for controlling release of the gas by the suction device to an outside gas release port, on the basis of an output signal of the concentration detection means.

In the fuel cell system, the concentration detection means detects the concentration of the gas in the fuel chamber, and it is possible to certainly detect whether or not the gas remains in the fuel chamber. Then, on the basis of the output signal of the concentration detection means, the control device controls the release of the gas by the suction device to the outside gas release port. In this way, since it is possible to substantially completely release the gas which is apt to contain an oxygen gas as an impurity when remaining in the fuel chamber, degradation of the oxygen electrode is mainly hard to promote.

It is preferable that in the fuel cell system, plural fuel cells are stacked, and the fuel cells are connected with each other by a separator integrally forming the gas supply port, the gas discharge port, and a gas passage for interconnecting the gas supply port and the gas discharge port. If doing so, since the fuel chamber is formed of all the gas passage, the fuel cell becomes easy to manufacture and compact, and it is possible to realize the improvement in the mounting property of the fuel cell system to an electric vehicle or the like and low cost.

Especially, in the fuel cell system, it is preferable that the concentration detection means is attached to the separator. By doing so, the separator having rigidity can firmly hold the concentration detection means. As the concentration detection means, an oxygen concentration sensor for detecting an oxygen concentration or a hydrogen concentration sensor for detecting a hydrogen concentration can be adopted.

In this case, it is preferable that the concentration detection means is attached to the separator positioned at the end portion of the fuel cell. By this, it is possible to sufficiently detect whether or not the gas remains in the fuel chamber in the whole fuel cell, the number of the concentration detection means can be decreased, and reduction in the cost of the fuel cell system can be realized.

Besides, it is preferable that a probe of the concentration detection means is provided in a region of the fuel chamber where the gas is apt to stagnate. According to confirmation by the present inventor et al., in the fuel chamber, there exist a region where a gas easily flows, and a region where a gas is apt to stagnate. In case the gas is apt to stagnate in the fuel chamber, eventually, the gas and the oxygen gas are apt to mix in the fuel chamber, and a portion containing the gas and the oxygen gas is apt to be produced in the hydrogen electrode, so that the output is lowered. Thus, when the concentration detection means is provided in the region of the fuel chamber where the gas is apt to stagnate, since the gas in the fuel chamber can be substantially completely sucked by the suction device, the effect of the invention becomes great. In the case where the fuel chamber is the gas passage for interconnecting the gas supply port and the gas discharge port, it is preferable that the probe of the concentration detection means is provided in a region of the gas passage where the gas is apt to stagnate. The region where the gas is apt to stagnate is specifically a region of the fuel chamber where the gas supply port and the gas discharge port are not directly connected.

In case the fuel chamber is such that a gas flows in a single passage, it is hard to produce a region in the fuel chamber where the gas easily flows and a region where the gas is apt to stagnate. In this case, the gas in the fuel chamber can be relatively easily and substantially completely sucked. However, if doing so, since the contact area between the hydrogen electrode and the gas is not very large and the passage resistance of the gas is large, a large output is hard to obtain. Especially, water such as produced water is apt to exist in the fuel chamber as well, and this defect is apt to become remarkable by the water, and all the more remarkable in the fuel cell in which the water is hard to discharge from the fuel chamber by its own weight.

In this point, when the fuel chamber is such that the gas can pass through plural paths, since the contact area between the hydrogen electrode and the gas is large, and the passage resistance of the gas is small, a large output is easy to obtain. In such a fuel chamber, a region where the gas easily flows and a region where the gas is apt to stagnate are apt to exist in the fuel chamber. In this case, when the concentration detection means is provided in the region where the gas is apt to stagnate, the fuel cell system can generate a large output in addition to the effect of the invention.

Specifically, in the case where the fuel cell is constituted by stacking plural fuel cells, the fuel cells can be connected with each other by the separator integrally forming the gas supply port, the gas discharge port, and the gas passage interconnecting the gas supply port and the gas discharge port. In case countless convex portions exist in the gas passage of the separator, the gas can flow through plural paths. In such a case, when the concentration detection means is provided in the region where the gas is apt to stagnate, the fuel cell system can generate a large output in addition to the effect of the invention.

BRIEF DESCRIPTION OF THE DRAWINGS

FIG. 6 is an elevation view of a separator of the embodiment of the invention.

DETAILED DESCRIPTION OF THE PREFERRED EMBODIMENTS

Hereinafter, embodiments embodying the present invention will be described with reference to the drawings.

Figure 1:
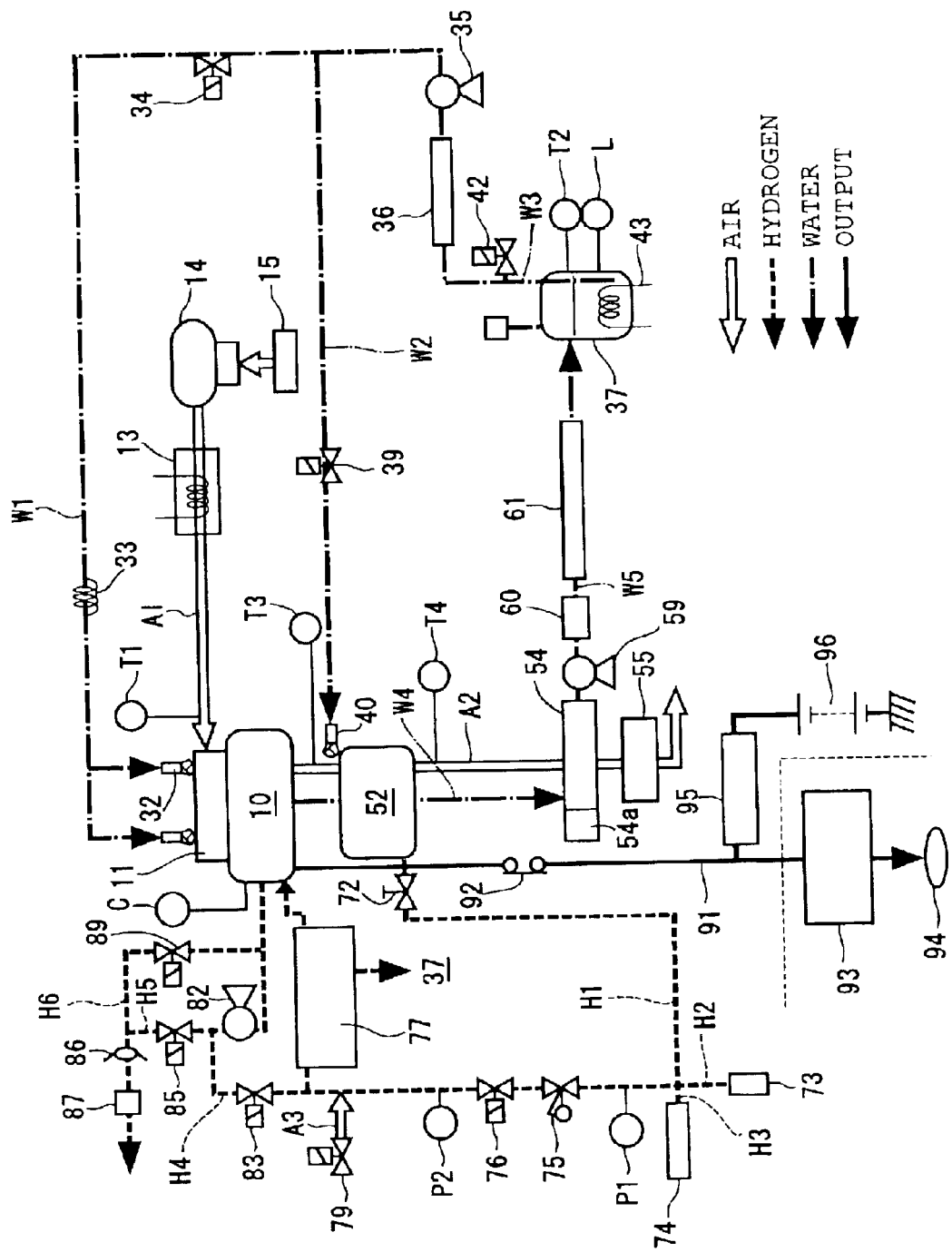
FIG. 1 is a structural view of a fuel cell system of an embodiment.

A fuel cell system of embodiment 1 is mounted in an electric vehicle, and constitutes, together with a battery, a power supply of a driving motor. As shown in FIG. 1, this fuel cell system is provided with a fuel cell assembly 10 containing a fuel cell stack 1 (see FIG. 4). An air manifold 11 is connected to an upper part of the fuel cell assembly 10, and an air supply pipe A1 is connected to the air manifold 11. An air supply fan 14 is connected to the air supply pipe A1 through an inlet air heater 13, and an air inlet filter 15 is provided at an outside air side of the air supply fan 14. Besides, an inlet air temperature sensor T1 is provided near the air manifold 11 of the air supply pipe A1. Air is supplied to the air manifold 11 by the air supply fan 14, and the supplied air is supplied to an oxygen electrode of each fuel cell through the air manifold 11.

Besides, plural direct injection nozzles 32 connected to a direct injection water piping W1 are fixed to the air manifold 11. The direct injection water piping W1 is connected with, from the side of the air manifold 11, a direct injection water piping heater 33, a direct injection water supplying electromagnetic valve 34, a direct injection pump 35, and a water tank 37 through a direct injection water filter 36. A filling pipe W2 branches off from the direct injection water piping W1 between the direct injection water supplying electromagnetic valve 34 and the direct injection pump 35, and the filling pipe W2 is connected with a filling nozzle 40 through a filling water supplying electromagnetic valve 39. Besides, a drainage pipe W3 branches off from the direct injection water piping W1 between the direct injection water filter 36 and the water tank 37; and the drainage pipe W3 is connected with a drainage electromagnetic valve 42. A water temperature sensor T2 and a water level sensor L are provided in the water tank 37, and a water tank heater 43 is provided in the water tank 37.

A hydrogen storing alloy tank 52 as a fuel gas storage device is provided at a lower part of the fuel cell assembly 10. An exhaust temperature sensor T3 is provided at a lower part of the fuel cell assembly 10. The filling pipe nozzle 40 is provided to the hydrogen storing alloy tank 52. A condenser 54 is provided at a lower part of the hydrogen storing alloy tank 52. A condenser fan 54a is provided in the condenser 54, and an air outlet filter 55 is provided at an outside air side of the condenser 54. An exhaust gas discharged from the fuel cell assembly 10 passes leading to the condenser 54 through the hydrogen storing alloy tank 52. This passage of this exhaust gas is an exhaust passage A2. And water such as produced water discharged from the fuel cell assembly 10 passes leading to the condenser 54 through the hydrogen storing alloy tank 52. This passage of this water is drainage passage W4. An exhaust temperature sensor T4 is provided also in the exhaust passage A2.

A drain pipe W5 linked with the water tank 37 is connected to the condenser 54, and the drain pipe W5 is provided with a water collection pump 59, a direct injection water ion exchange filter 60, and a direct injection water activated carbon filter 61 from the side of the condenser 54.

Figure 2:
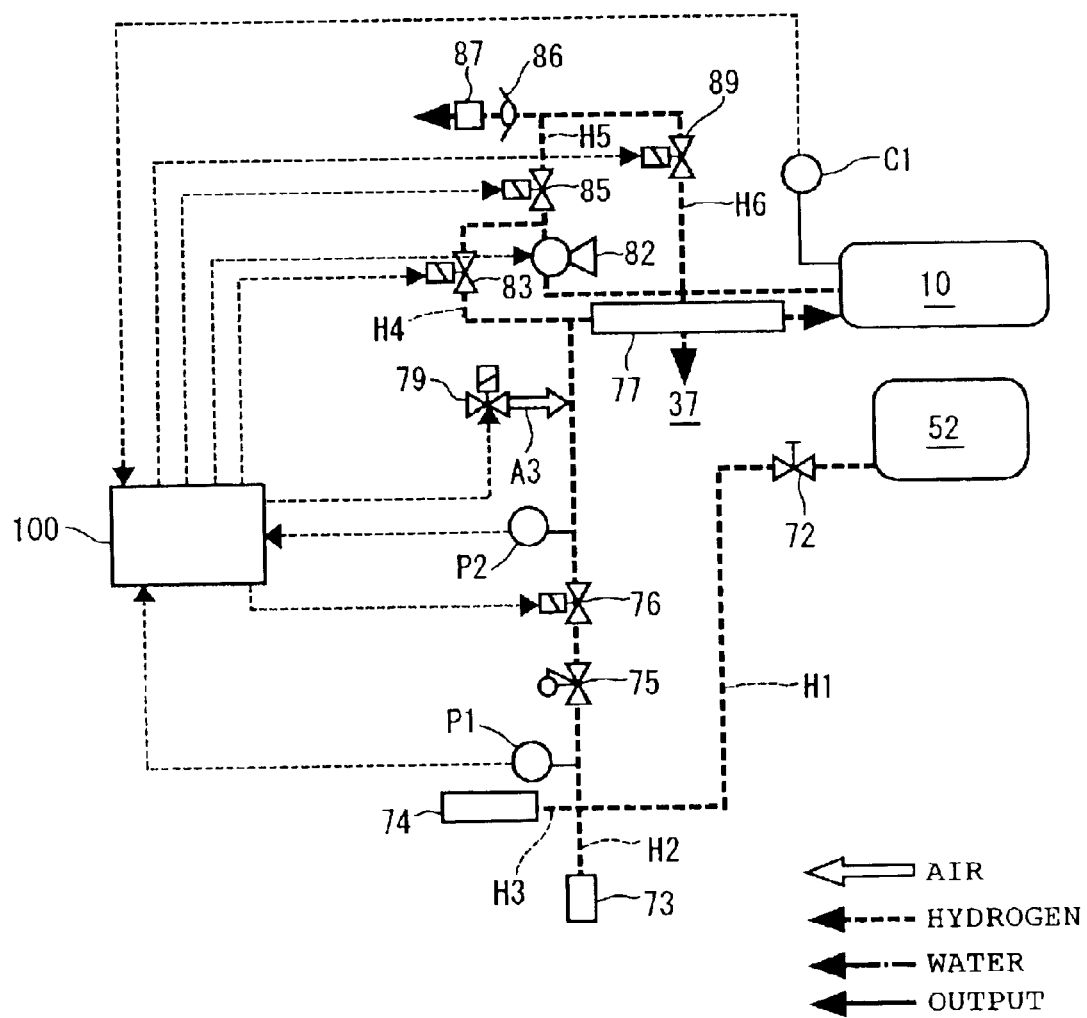
FIG. 2 is a main part structural view of the fuel cell system of the embodiment.

Also as shown in FIG. 2, a hydrogen supply pipe H1 linked to a side of the fuel cell assembly 10 is connected to the hydrogen storing alloy tank 52, and the hydrogen supply pipe H1 is provided with an MH main valve 72 near the hydrogen storing alloy tank 52. Besides, a hydrogen filling pipe H2 and a hydrogen purge pipe H3 are connected to the hydrogen supply pipe H1, a hydrogen filling valve 73 is connected to the hydrogen filling pipe H2, and a hydrogen purge valve 74 is connected to the hydrogen purge pipe H3. A hydrogen primary pressure sensor P1, a hydrogen pressure adjusting valve 75, a hydrogen supply electromagnetic valve 76, a hydrogen secondary pressure sensor P2, and a hydrogen gas-liquid separator 77 are provided on the side toward the fuel cell assembly 10 from the hydrogen filling pipe H2 and the hydrogen purge pipe H3. A drainage side of the hydrogen gas-liquid separator 77 is connected to the water tank 37. An outside air introduction pipe A3 opened to the outside air is connected to the hydrogen supply pipe H1 between the hydrogen secondary pressure sensor P2 and the hydrogen gas-liquid separator 77, and the outside air introduction pipe A3 is provided with a hydrogen side outside air introduction electromagnetic valve 79.

In the case where the hydrogen gas as fuel is supplied to a fuel chamber 22b, hydrogen released from the hydrogen storing alloy tank 52 is supplied to gas supply ports 22e and 22f of each of fuel cells 21 through the main valve 72, the hydrogen pressure adjusting valve 75, the hydrogen supply electromagnetic valve 76, and the hydrogen gas-liquid separator 77.

A hydrogen circulation pipe H4 is connected to the other side portion (communicating with gas discharge ports 22g and 22h of the fuel chamber 22b of the fuel cell 21) of the fuel cell assembly 10, and the hydrogen circulation pipe H4 is provided with a hydrogen suction pump 82 and a hydrogen circulation electromagnetic valve 83 from the side of the fuel cell assembly 10. The hydrogen circulation pipe H4, the hydrogen suction pump 82, the hydrogen circulation electromagnetic valve 83, and the hydrogen gas-liquid separator 77 constitute a circulation passage. The hydrogen suction pump 82 constitutes a suction device. In the case where a gas in the fuel chamber 22b is circulated by the hydrogen suction pump 82, hydrogen is discharged from the gas discharge ports 22g and 22h of the fuel chamber 22b by the hydrogen suction pump 82, and is refluxed to the gas supply ports 22e and 22f of the fuel chamber 22b through the hydrogen circulation pipe H4 and through the hydrogen gas-liquid separator 77.

Besides, a first hydrogen release pipe H5 communicating with the outside air is connected to the hydrogen circulation pipe H4 between the hydrogen suction pump 82 and the hydrogen circulation electromagnetic valve 83, and the first hydrogen release pipe H5 is provided with a hydrogen exhaust electromagnetic valve 85, a hydrogen check valve 86, and a hydrogen silencer 87 from the side of the hydrogen circulation pipe H4. The first hydrogen release pipe H5, the hydrogen exhaust electromagnetic valve 85, the hydrogen check valve 86, and the inside of the hydrogen silencer 87 constitute a release passage, and an opening of the first hydrogen release pipe H5 opened to the outside air is an outside gas release port. Incidentally, switching of the circulation passage and the discharge passage is performed by the hydrogen circulation electromagnetic valve 83 and the hydrogen exhaust electromagnetic valve 85.

Further, a second hydrogen release pipe H6 linked with the first hydrogen release pipe H5 between the hydrogen exhaust electromagnetic valve 85 and the hydrogen check valve 86 is connected to the hydrogen circulation pipe H4 between the fuel cell assembly 10 (communicating with the gas discharge ports 22g and 22h of the fuel chamber 22b) and the hydrogen suction pump 82. A hydrogen suction bypass valve 89 is provided in the second hydrogen release pipe H6. The first and the second hydrogen release pipes H5 and H6 are provided in parallel between the fuel cell assembly 10 and the outside gas release port as stated above, and this is because the hydrogen suction pump 82 is unsuitable for discharge of liquid water, and in the case where the liquid water is discharged from the gas discharge ports 22g and 22h of the fuel chamber 22b as the need arises, the second hydrogen release pipe H6 is used. Besides, hydrogen concentration sensors C (27c to 27d), the details of which are described later, are provided in the fuel cell assembly 10.

Then, as shown in FIG. 1, a code 91 is connected to both output terminals 10e (see FIG. 4) of the fuel cell assembly 10, and a motor 94 capable of driving a vehicle is connected to the code 91 through an output relay 92 and an inverter 93 from the side of the fuel cell assembly 10. An output control circuit 95 is electrically connected to the code 91 between the output relay 92 and the inverter 93, and a storage device 96 made of a grounded secondary battery or capacitor is electrically connected to the output control circuit 95.

Figure 3:
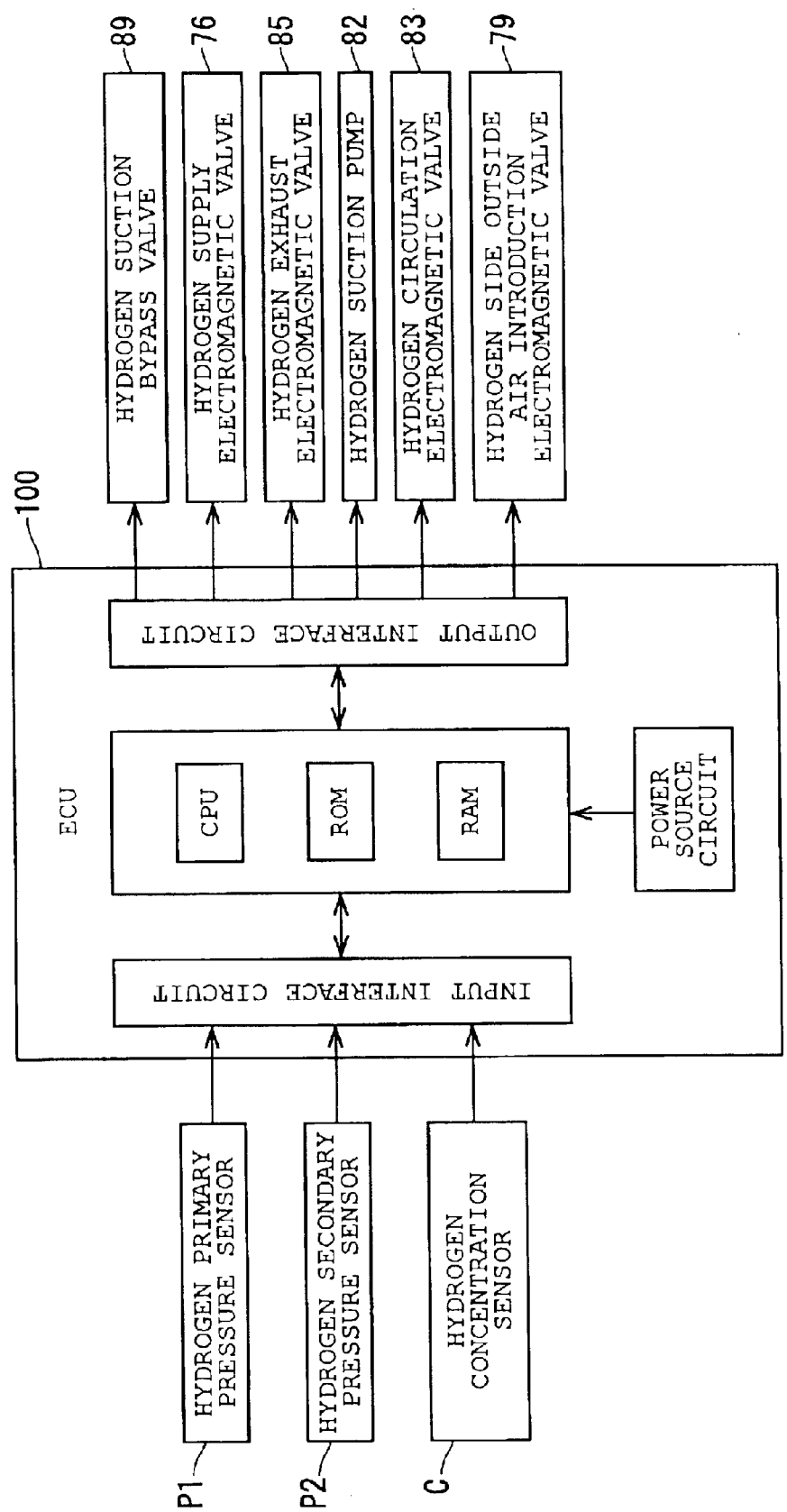
FIG. 3 is a block diagram of a control device of the fuel cell system of the embodiment.

As shown in FIG. 2, the hydrogen primary pressure sensor P1, the hydrogen secondary pressure sensor P2, and the hydrogen concentration sensors C (27c to 27d) are, also as shown in FIG. 3, electrically connected to an input interface circuit of an ECU 100 as a control device and a switching device. Besides, as shown in FIG. 2, the hydrogen supply electromagnetic valve 76, the hydrogen side outside air introduction electromagnetic valve 79, the hydrogen circulation electromagnetic valve 83, the hydrogen suction pump 82, the hydrogen exhaust electromagnetic valve 85, and the hydrogen suction bypass valve 89 are, also as shown in FIG. 3, electrically connected to an output interface circuit of the ECU 100. The ECU 100 includes a CPU, a ROM, a RAM and a power source circuit in addition.

Figure 4:
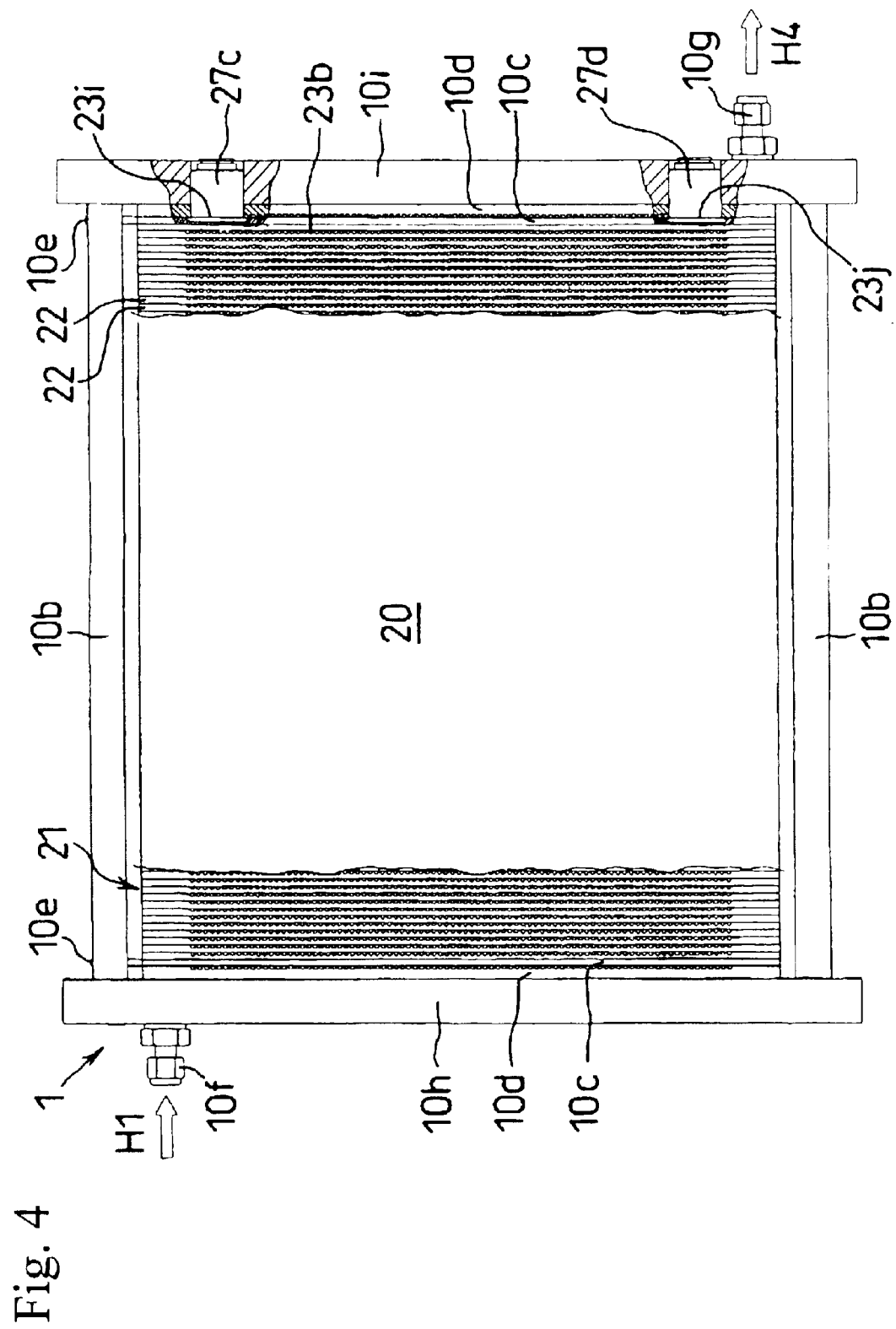
FIG. 4 is a plan view of a fuel cell of the embodiment.
Figure 5:
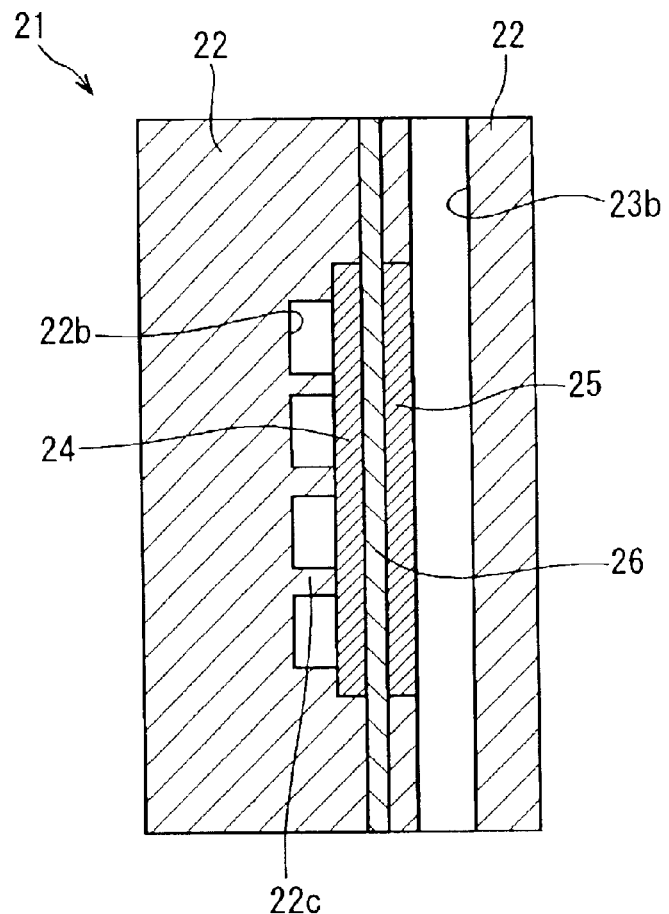
FIG. 5 is a schematic sectional view of a cell of the embodiment.

As shown in FIG. 4, the fuel cell stack 1 of the fuel cell assembly 10 is such that end plates 10h and 10i are provided at both ends of a stack 20, and both the end plates 10h and 10i are each held by two rods 10b in a width direction. Incidentally, current collecting plates 10c and insulating plates 10d are interposed between both ends of the stack 20 in the longitudinal direction and between both the end plates 10h and 10i. The stack 20 is such that cells 21 as respective fuel cells schematically shown in FIG. 5 are combined while adjacent separators 22 are made common. Each of the cells 21 is constituted by the separators 22 forming a pair, a hydrogen electrode (anode) 24 provided at one surface side of each of the separators 22, an air electrode (cathode) 25 provided at the other surface side of each of the separators 22, and an electrolyte layer 26 of a solid electrolyte film type made of an ion exchange resin provided between the hydrogen electrode 24 and the air electrode 25. A catalyst such as platinum is held in the electrolyte of the hydrogen electrode 24 and the electrolyte of the air electrode 25. All the hydrogen electrodes 24 are electrically connected to the one current collecting plate 10c shown in FIG. 4, all the air electrodes 25 shown in FIG. 5 are electrically connected to the other current collecting plate 10c shown in FIG. 4, and the respective terminals 10e of both the collecting electrodes 10c are protruded from the stack 20.

As schematically shown in FIG. 5 and shown in FIG. 6 in detail, concave portions 22b, the periphery of each of which is surrounded, are provided on one surface of the separator 22 positioned at one end of the stack 20, and plural convex portions 22c long in the vertical direction are aligned in the longitudinal direction at bottom surfaces of the concave portions 22b while grooves 22d are provided between them. The respective convex portions 22c are designed to be in contact with the hydrogen electrode 24, and the respective grooves 22d are slightly higher than the bottom surface. As shown in FIG. 6, the two upper and lower gas supply ports 22e and 22f are provided in the concave portion 22b at one end side in the longitudinal direction, and the two upper and lower gas discharge ports 22g and 22h are provided at the other end side in the longitudinal direction. As shown in FIG. 4, on the other surface of the separator 22 positioned at the other end of the stack 20, as schematically shown in FIG. 5, plural air flow passages 23b as oxygen chambers extending vertically are formed. Both the concave portions 22b and the like and the air flow passages 23b are formed in the other separator 22.

As shown in FIG. 4, in the separator 22 positioned at the other end of the stack 20, as shown in FIG. 6 in detail, when viewed from the side of the concave portion 22b, a sensor attachment hole 23i is provided in a lower part at the one end side, and a sensor attachment hole 23j is provided in an upper part at the other end side.

All the gas supply ports 22e and 22f of the respective separators 22 communicate with each other, and lead to a gas supply connection part 10f fixed to the one end plate 10h shown in FIG. 4. The gas supply connection part 10f is fixed to an upper part of the end plate 10h at one end side, and the hydrogen supply pipe H1 shown in FIGS. 1 and 2 is connected to the gas supply connection part 10f.

Besides, all the gas discharge ports 22g and 22h of the respective separators 22 shown in FIG. 6 also communicate with each other, and lead to a gas discharge connection part log fixed to the other end plate 10i shown in FIG. 4. The gas discharge connection part 10g is fixed to a lower part of the other end side of the end plate 10i, and the hydrogen circulation pipe H4 shown in FIGS. 1 and 2 is connected to the gas discharge connection part 10g.

Thus, as shown in FIG. 6, the respective concave portions 22b formed on the surfaces of the respective separators 22 become gas passages as the fuel chambers 22b communicating with the gas supply ports 22e and 22f and the gas discharge ports 22g and 22h. In the gas passages, due to the existence of the plural convex portions 22c, the hydrogen gas as the fuel gas can flow in plural paths, and by this, the contact area between the hydrogen electrode 24 and the hydrogen gas is large, and the flow passage resistance of the hydrogen gas is small, so that a large output is easy to obtain. On the other hand, the sensor attachment holes 23i and 23j are regions where the hydrogen gas is apt to stagnate in the gas passage.

As shown in FIG. 4, the hydrogen concentration sensor C (27c) is fixed to the lower part of the other end plate 10i at the one end side, and the hydrogen concentration sensor C (27d) is fixed to the upper part of the end plate 10i at the other end side as well. In this way, the hydrogen concentration sensors C (27c to 27d) are provided in the regions where the hydrogen gas is apt to stagnate in the fuel chamber 22b, so that the hydrogen gas in the fuel chamber 22b can be almost completely sucked by the hydrogen suction pump 82 and the like.

Figure 7:
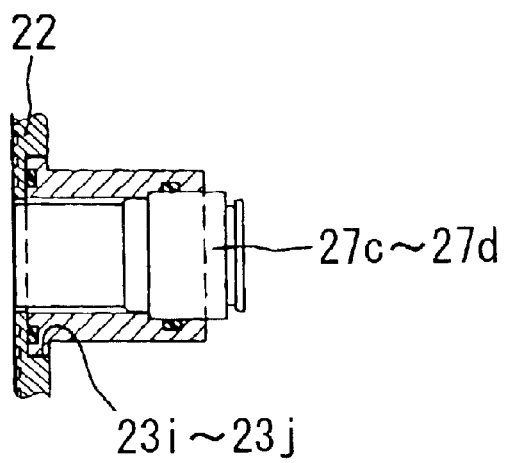
FIG. 7 is a main part sectional view of the separator of the embodiment.

As shown in FIG. 7, probes of the hydrogen concentration sensors C (27a to 27d) are provided in the sensor attachment holes 23i and 23j of the separator 22 positioned at the other end of the stack 20. In this way, the separators 22 having rigidity firmly hold the hydrogen concentration sensors C (27c to 27d). Besides, since the hydrogen concentration sensors C (27c to 27d) are attached to the separators 22 positioned at the other end of the fuel cell stack 1, it is possible to sufficiently detect whether or not the hydrogen gas remains in the fuel chamber 22b in the whole fuel cell stack 1, the number of the hydrogen concentration sensors C (27c to 27d) can be decreased, and the reduction in cost of the fuel cell system is realized.

In the fuel cell system structured as described above, the ECU 100 shown in FIGS. 2 and 3 makes a control in accordance with flowcharts shown in FIGS. 8 to 13.

Figure 8:
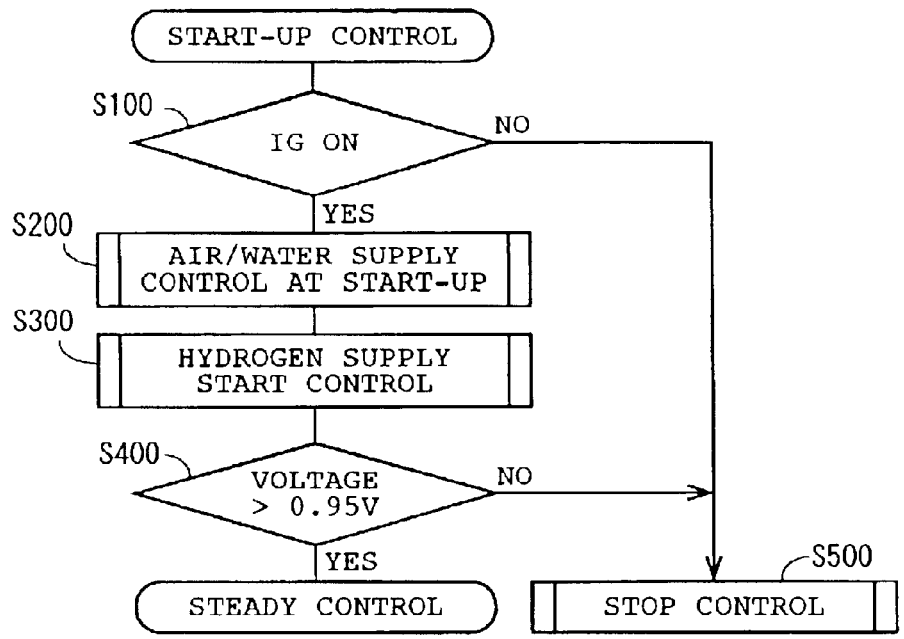
FIG. 8 is a view showing a main routine of start-up control by a control device of the embodiment.
Figure 11:
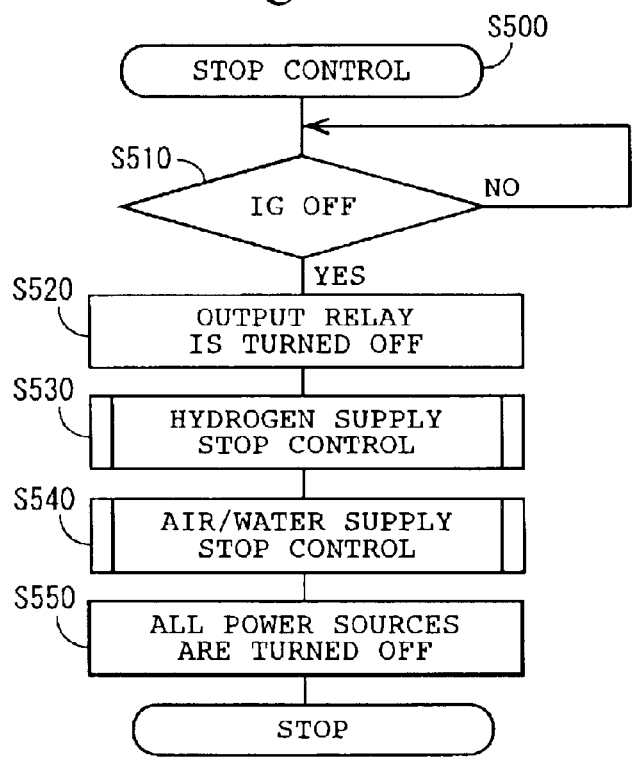
FIG. 11 is a view showing a main routine of stop control by the control device of the embodiment.
Figure 9:
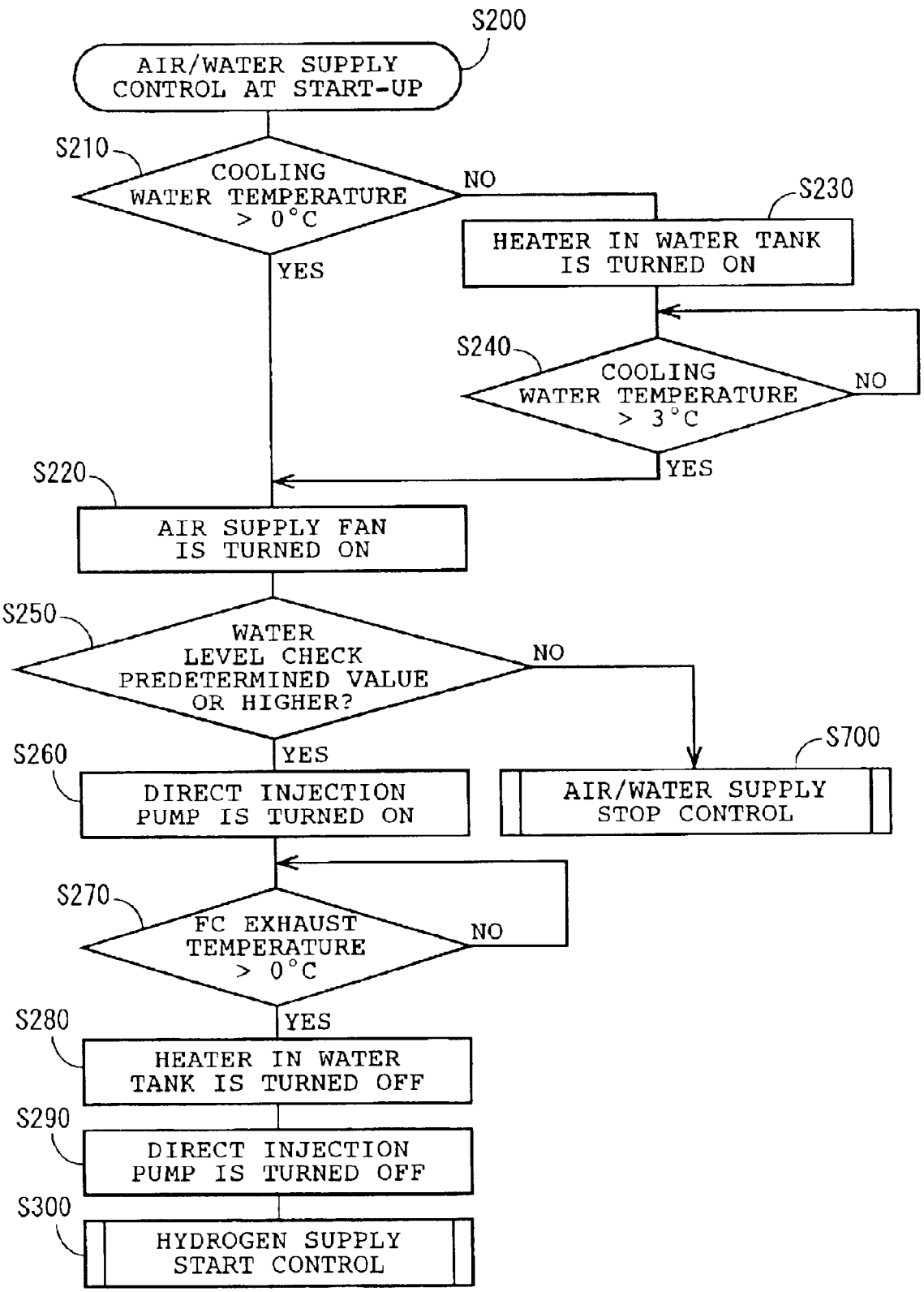
FIG. 9 is a view showing a subroutine of air/water supply control at the time of start-up by the control device of the embodiment.
Figure 10:
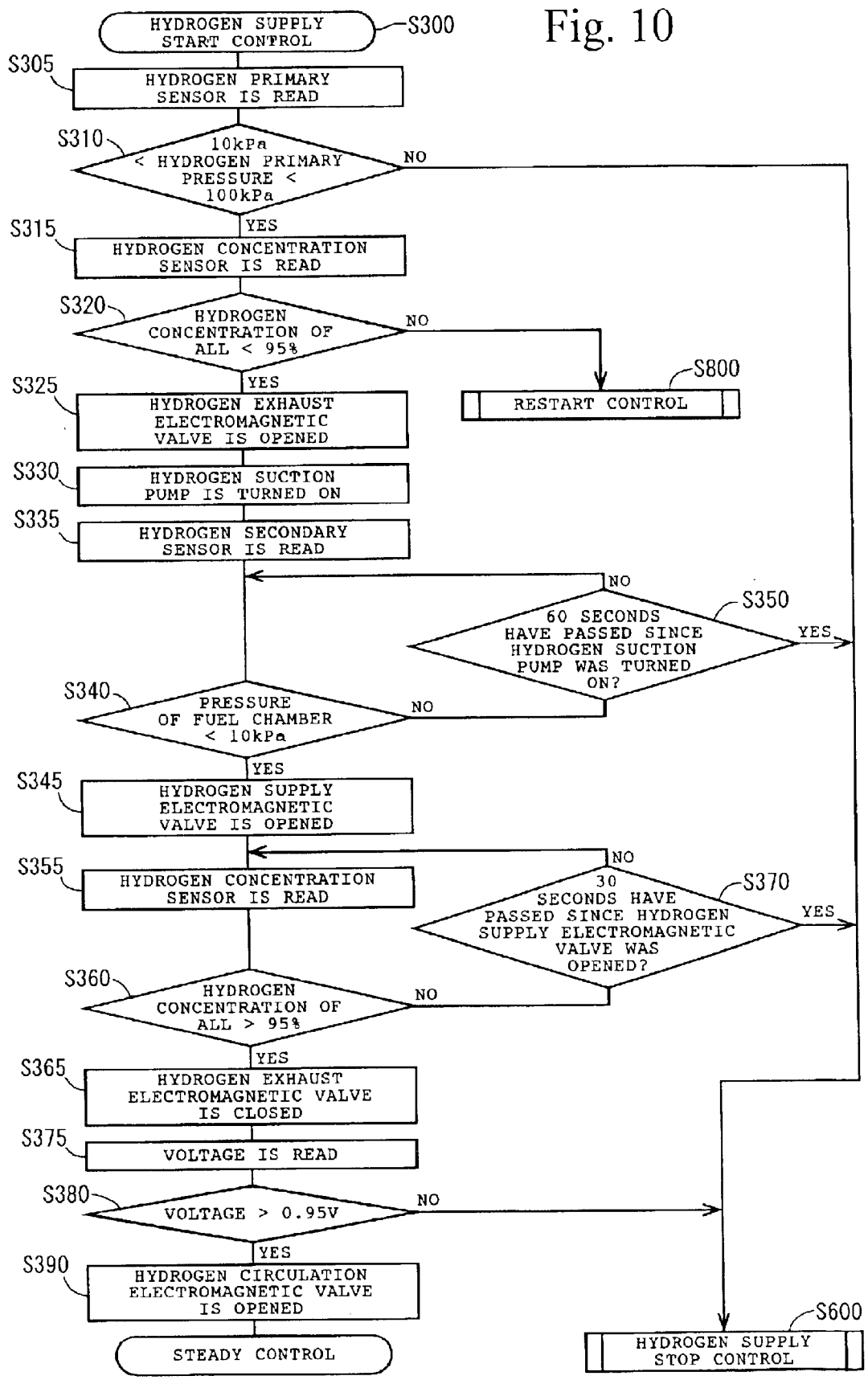
FIG. 10 is a view showing a subroutine of hydrogen supply start control by the control device of the embodiment.

When a main routine of start-up control shown in FIG. 8 is executed, first, it is judged whether an ignition key is switched ON at step S100. Here, if YES, the processing proceeds to step S200, and the subroutine S200 of air/water supply control at start-up shown in FIG. 9 is executed. Thereafter, the processing proceeds to step S300 shown in FIG. 8, and the subroutine S300 of hydrogen supply start control shown in FIG. 10 is executed. Then, the processing proceeds to step S400 shown in FIG. 8, and it is judged whether or not a voltage by power generation of the fuel cell stack 1 exceeds 0.95 V. Here, if YES, a subroutine of steady control, the details of which are omitted, is executed. At the step S100 or the step S400, if NO, a main routine S500 of stop control shown in FIG. 11 is executed.

Figure 13:
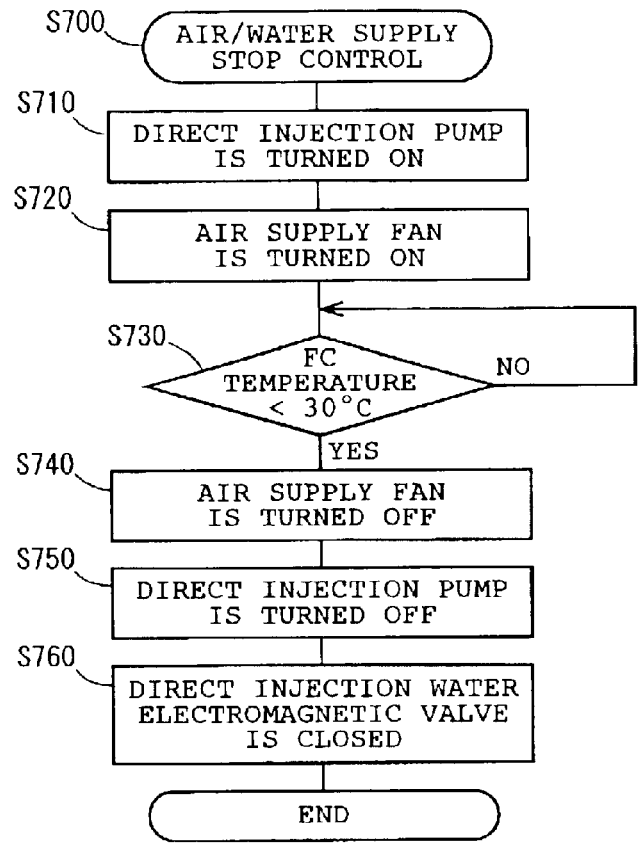
FIG. 13 is a view showing a subroutine of air/water supply stop control by the control device of the embodiment.

In the subroutine S200 of the air/water supply control at start-up shown in FIG. 9, first, at step S210, it is judged whether or not the temperature of water stored in the water tank 37 and detected by the water temperature sensor T2 exceeds 0° C. Here, if YES, the processing proceeds to step S220. If NO, the processing proceeds to step S230. At the step S230, the water tank heater 43 is turned ON, and the processing proceeds to step S240. At the step S240, a judgment is repeated until the temperature of water detected by the temperature sensor T2 exceeds 3° C., and if YES, the processing proceeds to step S220. At the step S220, the air supply fan 14 is turned ON, and the processing proceeds to step S250. At the step S250, it is judged whether or not the water level in the water tank 37 detected by the water level sensor L exceeds a predetermined value. Here, if YES, the processing proceeds to step S260. If NO, a subroutine S700 of air/water supply stop control shown in FIG. 13 is executed. At the step S260, the direct injection pump 35 is turned ON, and the processing proceeds to step S270. At the step S270, a judgment as to whether the temperature of the exhaust gas detected by the exhaust temperature sensors T3 and T4 exceeds 0° C. is repeated, and if YES, the processing proceeds to step S280. At the step S280, the water tank heater 43 is turned OFF, and the processing proceeds to step S290. At the step S290, the direct injection pump 35 is turned OFF, and the subroutine 300 of the hydrogen supply start control shown in FIG. 10 is executed.

Figure 14:
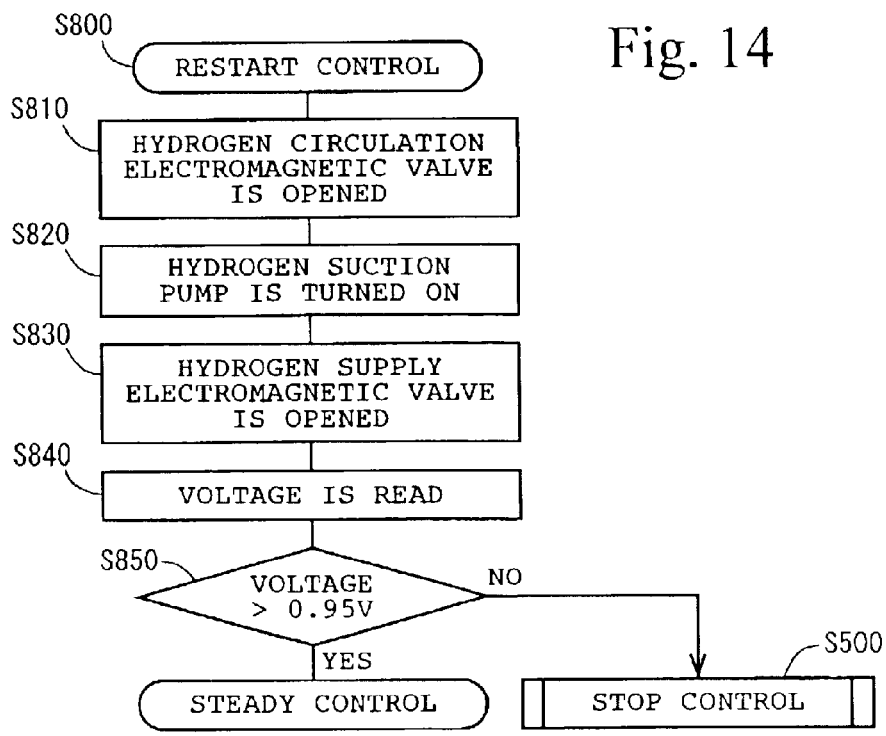
FIG. 14 is a view showing a subroutine of restart control by the control device of the embodiment.

At the subroutine S300 of the hydrogen supply start control, first, at step S305, an output signal of the hydrogen primary pressure sensor P1 is read in, and the processing proceeds to step S310. At the step S310, it is judged whether or not the hydrogen primary pressure exceeds 10 kPa and is less than 100 kPa. Here, if YES, the processing proceeds to step S315. At the step S315, output signals of the hydrogen concentration sensors C (27c to 27d) are read in, and the processing proceeds to step S320. At the step S320, it is judged whether or not the hydrogen concentration by all the hydrogen concentration sensors C (27c to 27d) is less than 95%. Here, if YES, the processing proceeds to step S325. On the other hand, here, if NO, a subroutine S800 of restart control shown in FIG. 14 is executed.

At the step S325, the hydrogen exhaust electromagnetic valve 85 is opened, and the processing proceeds to step S330. At the step S330, the hydrogen suction pump 82 is turned ON, and the processing proceeds to step S335. At the step S335, an output signal of the hydrogen secondary pressure sensor P2 is read in, and the processing proceeds to step S340. At the step S340, it is judged whether or not the pressure of the fuel chamber (gas passage) 22b formed of the concave portion 22b at the separators 22 of both ends of the stack 20 is less than 10 kPa. Here, if YES, the processing proceeds to step S345 (discharge mode). Here, if NO, the processing proceeds to step S350. At the step S350, it is judged whether or not 60 seconds have passed since the hydrogen suction pump 82 was turned ON. Here, if NO, the processing returns to the step S340.

At the step S345, the hydrogen supply electromagnetic valve 76 is opened, and the processing proceeds to step S355 (supply mode). At the step S355, output signals of the hydrogen concentration sensors C (27c to 27d) are read in, and the processing proceeds to step S360. At the step S360, it is judged whether or not the hydrogen concentration by all the hydrogen concentration sensors C (27c to 27d) is less than 95%. Here, if YES, the processing proceeds to step S365. Here, if NO, the processing proceeds to step S370. At the step S370, it is judged whether or not 30 seconds have passed since the hydrogen supply electromagnetic valve 76 was opened. Here, if NO, the processing returns to the step S355.

At the step S365, the hydrogen exhaust electromagnetic valve 85 is closed, and the processing proceeds to step S375. At the step S375, a voltage is read in, and the processing proceeds to step S380. At the step S380, it is judged whether or not the voltage exceeds 0.95 V. Here, if YES, the processing proceeds to step S390. At the step S390, the hydrogen circulation electromagnetic valve 83 is opened, and then, a subroutine of steady control is executed (circulation mode). If NO at the step S310, if YES at the step S350 or the step S370, or if NO at the step S380, a subroutine S600 of hydrogen supply stop control shown in FIG. 12 is executed.

On the other hand, after a steady operation, when the main routine of the stop control shown in FIG. 11 is executed, first, at step S510, it is judged whether or not the ignition key is turned OFF. Here, if YES, the processing proceeds to step S520. At the step S520, the output relay 92 is turned OFF, and the processing proceeds to step S530. At the step S530, the subroutine S600 of the hydrogen supply stop control shown in FIG. 12 is executed, and the processing proceeds to step S540 shown in FIG. 11. At the step S540, the subroutine S700 of the air/water supply stop control shown in FIG. 13 is executed, and the processing proceeds to step S550 shown in FIG. 11. At the step S550, all power sources are turned OFF, and the fuel cell system is stopped. Besides, at the step S510, the fuel cell system is watching that the ignition key is turned OFF.

Figure 12:
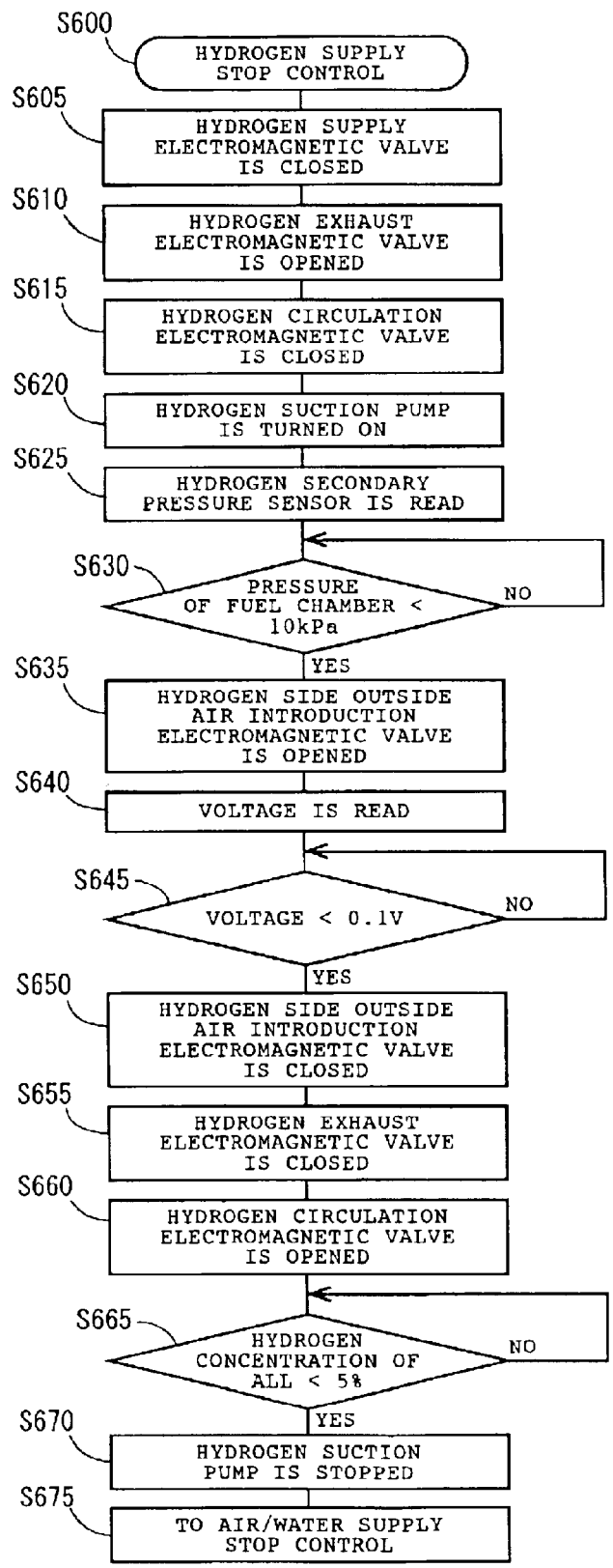
FIG. 12 is a view showing a subroutine of hydrogen supply stop control by the control device of the embodiment.

When the subroutine S600 of the hydrogen supply stop control shown in FIG. 12 is executed, first, at step S605, the hydrogen supply electromagnetic valve 76 is closed, and the processing proceeds to step S610. At the step S610, the hydrogen exhaust electromagnetic valve 85 is opened, and the processing proceeds to step S615. At the step S615, the hydrogen circulation electromagnetic valve 83 is closed, and the processing proceeds to step S620. At the step S620, the hydrogen suction pump 82 is turned ON, and the processing proceeds to step S625 (discharge mode). At the step S625, the output signal of the hydrogen secondary pressure sensor P2 is read in, and the processing proceeds to step S630. At the step S630, when the pressure of the fuel chamber 22b becomes less than 10 kPa, the processing proceeds to step S635. At the step S635, the hydrogen side outside air introduction electromagnetic valve 79 is opened, and the processing proceeds to step S640. At the step S640, a voltage is read in, and the processing proceeds to step S645. At the step S645, when the voltage becomes less than 0.1 V, the processing proceeds to step S650. At the step S650, the hydrogen side outside air introduction electromagnetic valve 79 is closed, and the processing proceeds to step S655. At the step S655, the hydrogen exhaust electromagnetic valve 85 is closed, and the processing proceeds to step S660. At the step S660, the hydrogen circulation electromagnetic valve 83 is opened, and the processing proceeds to step S665. At the step S665, when the hydrogen concentration by all the hydrogen concentration sensors C (27c to 27d) becomes less than 5%, the processing proceeds to step S670. At the step S670, the hydrogen suction pump 82 is stopped, and the processing proceeds to step S675. At the step S675, a jump to the subroutine S700 of the air/water supply stop control shown in FIG. 13 is made.

When the subroutine S700 of the air/water supply stop control is executed, first, at step S710, the direct injection pump 35 is turned ON, and the processing proceeds to step S720. At the step S720, the air supply fan 14 is turned ON, and the processing proceeds to step S730. At the step S730, when the temperature of the fuel cell stack 1 presumed from the exhaust temperature detected by the exhaust temperature sensors T3 and T4 becomes less than 30° C., the processing proceeds to step S740. At the step S740, the air supply fan 14 is turned OFF, and the processing proceeds to step S750. At the step S750, the direct injection pump 35 is turned OFF, and the processing proceeds to step S760. At the step S760, the direct injection water supply electromagnetic valve 34 is closed, and the program is ended.

Besides, when the subroutine S800 of the restart control shown in FIG. 14 is executed, first, at step S810, the hydrogen circulation electromagnetic valve 83 is opened, and the processing proceeds to step S820. At the step S820, the hydrogen suction pump 82 is turned ON, and the processing proceeds to step S830 (circulation mode). At the step S830, the hydrogen supply electromagnetic valve 76 is opened, and the processing proceeds to step S840 (supply mode). At the step S840, a voltage is read in, and the processing proceeds to step S850. At the step S850, it is judged whether or not the voltage exceeds 0.95 V. Here, if YES, the subroutine of steady control is executed. Here, if NO, the main routine S500 of the stop control shown in FIG. 11 is executed.

During these, in the fuel cell system, after the fuel cell stack 1 is stopped, since the hydrogen gas remaining in the fuel chamber 22b can be effectively sucked by the hydrogen suction pump 82 from the gas discharge ports 22g and 22h, the hydrogen gas and the air do not mix in the fuel chamber 22b, and a portion containing the hydrogen gas and the air is not produced in the hydrogen electrode 24. Thus, since the potential of the oxygen electrode 26 does not become high, deterioration does not occur mainly in the catalyst in the electrolyte of the oxygen electrode 26, and the output is not lowered.

Besides, in this fuel cell system, the gas sucked by the hydrogen suction pump 82 and the like can be made to flow into the circulation passage or the discharge passage by the ECU 100. In the case where the gas is made to flow into the circulation passage, the gas can be refluxed to the gas supply ports 22e and 22f. Thus, in this case, reuse of the gas becomes possible, and further, ununiformity of the concentration distribution of the gas in the gas passage is eliminated, and partial stagnation of the gas can be prevented. On the other hand, at the time of start-up or the like, when not a gas of reuse, but a pure gas occluded in the hydrogen storing alloy tank 52 is desirable, the gas is made to flow into the discharge passage, and the gas can also be made not to be refluxed from the outside gas release port into the fuel chamber 22b.

Thus, according to this fuel cell system, it is possible to realize both high efficiency and prevention of output reduction in the case where the operation and stop of the fuel cell stack 1 are repeated for a long period of time.

Besides, in this fuel cell system, since the hydrogen suction pump 82 and the like makes the gas flow into the circulation passage or the discharge passage, it becomes unnecessary to provide a device for only making the gas flow into the circulation passage, or a device for only making the gas flow into the discharge passage, and the contribution to space-saving and low cost is great. The effect can realize the improvement in the mounting property to an electric vehicle requiring extension of travel distance and high speed, and the low cost. Especially, in this fuel cell system, the fuel cell stack 1 includes the separators 22 for integrally forming the gas discharge ports 22g and 22h, the gas supply ports 22e and 22f, and the gas passages for interconnecting the gas supply ports 22e and 22f and the gas discharge ports 22g and 22h. Besides, the fuel cell stack 1 is constituted by the plural cells 21, and the cells 21 are connected with each other by the separators 22. Thus, the fuel cell stack 1 is easy to manufacture and is compact, and the improvement in the mounting property of the fuel cell system to the electric vehicle and the low cost are certainly realized.

Incidentally, in the above embodiment, although the hydrogen concentration sensor C is adopted as the concentration detection means, an oxygen concentration sensor can be adopted instead of the hydrogen concentration sensor C.

Figure 15:
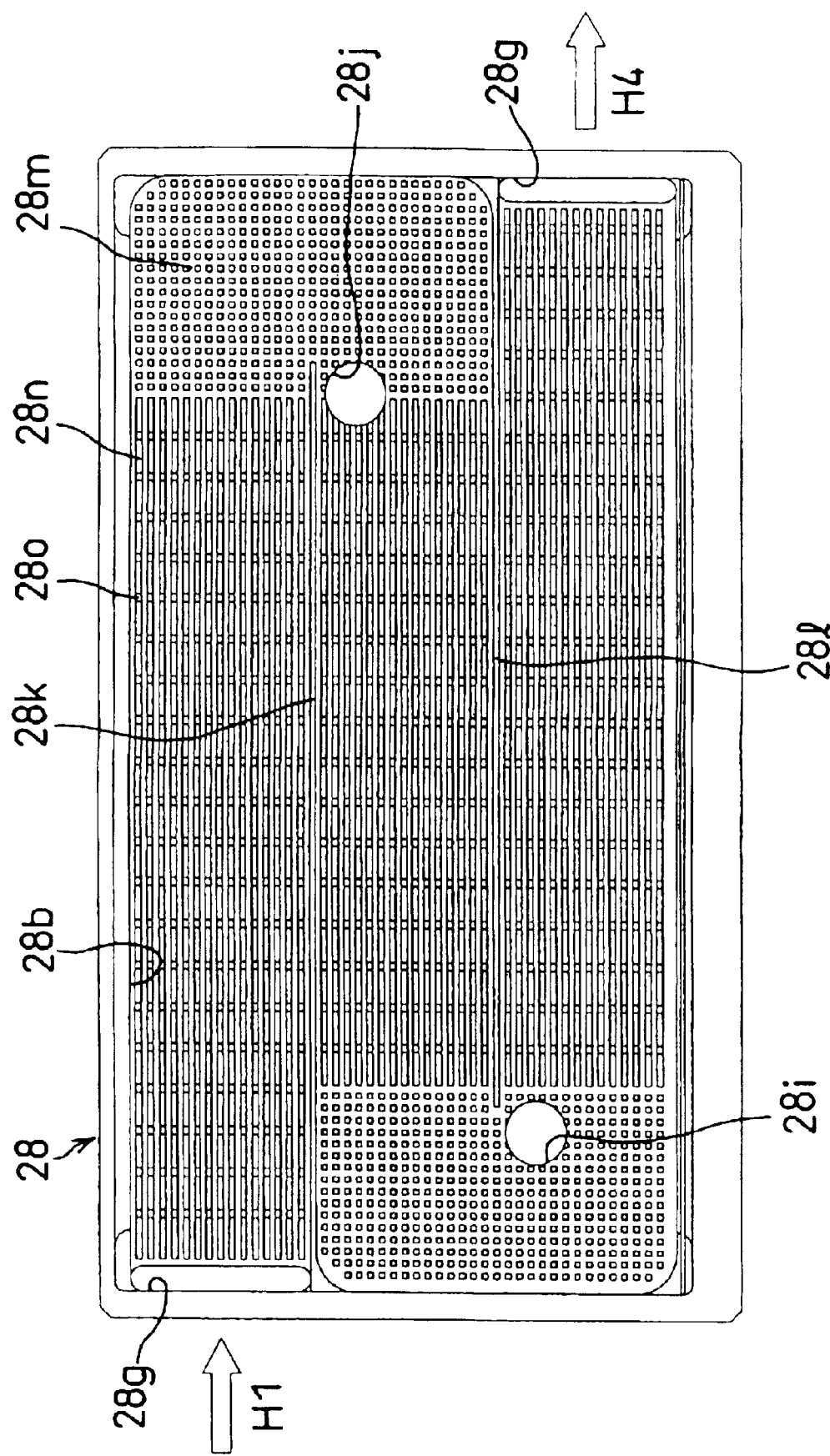
FIG. 15 is an elevation view of a separator of a modified embodiment.

Besides, in the above embodiment, although the separator 22 relatively low in the height direction is adopted in the fuel cell stack 1, as shown in FIG. 15, the fuel cell stack 1 can also be constituted by separators 28 relatively high in the height direction. A concave portion 28b, the periphery of which is surrounded, is provided on one surface of the separators 28, and in the concave portion 28b, one gas supply port 28e is provided at an upper part of one end side in the longitudinal direction, and one gas discharge port 28g is provided at a lower part at the other end side in the longitudinal direction. The concave portion 28b is provided with a partition wall 28k extending horizontally from a left edge portion and not connecting with a right edge portion so that the hydrogen gas supplied from the gas supply port 28e is guided substantially horizontally, and a partition wall 28l extending horizontally from the right edge portion and not connecting with the left edge portion so that the thus guided hydrogen gas is returned from the partition wall 28k to reach the lower part and is again guided substantially horizontally. Besides, at the lower surface of the concave portion 28b, there are plural first convex portions 28m projecting in square pole shape in the region in the vicinity of the right end of the partition wall 28k and in the region in the vicinity of the left end of the partition wall 28l, and plural second convex portions 22n long in the horizontal direction in the remaining region. Grooves 28o slightly higher than the bottom surface exist between the respective second convex portions 28n, and the respective second convex portions 22n are aligned in the longitudinal direction. The partition walls 28k and 28l, the respective first convex portions 28m, and the respective second convex portions 22n are in contact with a hydrogen electrode 24.

In the separator 28 positioned at the other end of the stack 20, a sensor attachment hole 28i is provided in the vicinity of the left end of the partition wall 28l when viewed from the side of the concave portion 28b, and a sensor attachment hole 28j is provided in the vicinity of the right end of the partition wall 28k. The other structure is similar to the separator 22.

Thus, each of the concave portions 28b formed on the one surface of the respective separators 28 forms a gas passage twice folded as the fuel chamber 28b communicating with the gas supply port 28e and the gas discharge port 28g. In the gas passage, by the existence of the plural first convex portions 28m and second convex portions 28n, the hydrogen gas can flow in plural paths, and the sensor attachment holes 28i and 28j are regions where the hydrogen gas is apt to stagnate in the gas passage. Even when these separators 28 are adopted and hydrogen concentration sensors C are provided in the sensor attachment holes 28i and 28j, the hydrogen gas in the fuel chamber 28b can be substantially completely sucked by the hydrogen suction pump 82 and the like.

Incidentally, in the above embodiment, although the direct injection water supplying electromagnetic valve 34, the filling water supplying electromagnetic valve 39, the drainage electromagnetic valve 42, the hydrogen supply electromagnetic valve 76, the hydrogen side outside air introduction electromagnetic valve 79, the hydrogen circulation electromagnetic valve 83 and the hydrogen exhaust electromagnetic valve 85 are constructed by electromagnetic valves, these can be constructed by servo valves and the like.

What is claimed is:

1. A fuel cell system comprising a fuel cell including a fuel chamber for supplying hydrogen to a hydrogen electrode and an oxygen chamber for supplying oxygen to an oxygen electrode, wherein the fuel cell system comprises:
   a gas supply port for supplying a gas into the fuel chamber;
   a gas discharge port for discharging the gas from the fuel chamber;
   a suction device for sucking the gas from the gas discharge port;
   a circulation passage for interconnecting the gas discharge port and the gas supply port through the suction device; and
   a release passage for interconnecting the gas discharge port and an outside gas release port through the suction device.

2. A fuel cell system according to claim 1, further comprising a switching device for switching between the circulation passage and the release passage.

3. A fuel cell system according to claim 2, wherein the switching device selects the release passage at a time of start-up or stopping of the fuel cell, and the circulation passage at a time of operation of the fuel cell.

4. A fuel cell system according to claim 1, wherein the fuel cell includes a separator integrally forming a gas supply port, a gas discharge port, and a gas flow passage for interconnecting the gas supply port and the gas discharge port.

5. A fuel cell system according to claim 4, wherein plural fuel cells are stacked, and the fuel cells are connected with each other through the separator.

6. A fuel cell system according to claim 1, wherein the suction device includes a suction pump.

7. A fuel cell system according to any one of claims 4, wherein the suction device includes a suction pump.

8. A fuel cell system comprising a fuel cell including a fuel chamber for supplying hydrogen to a hydrogen electrode and an oxygen chamber for supplying oxygen to an oxyqen electrode, wherein the fuel cell system comprises:
- a gas storage device for storing a gas containing the hydrogen;
- a gas supply port for supplying the gas into the fuel chamber;
- a gas discharge port for discharging the gas from the fuel chamber;
- a suction device for sucking the gas from the gas discharge port; and
- a control device, and
- wherein the control device includes:
- a circulation mode for operating the suction device to reflux the gas sucked from the gas discharge port to the gas supply port;
- a discharge mode for operating the suction device to release the gas sucked from the gas discharge port to an outside gas release port; and
- a supply mode for supplying the gas from the gas storage device to the gas supply port.

9. A fuel cell system according to claim 8, wherein plural fuel cell are stacked, and the fuel cells are connected with each other through a separator integrally forming a gas supply port, a gas discharge port, and a gas passage for interconnecting the gas supply port and the gas discharge port.

10. A fuel cell system comprising a fuel cell including a fuel chamber for supplying hydrogen to a hydrogen electrode and an oxygen chamber for supplying oxygen to an oxygen electrode, the fuel cell system comprises:
- a gas storage device for storing a gas containing the hydrogen;
- a gas supply port for supplying the gas into the fuel chamber;
- a gas discharge port for discharging the gas from the fuel chamber;
- a suction device for sucking the gas from the gas discharge port; and
- a control device, and
- wherein the control device releases the gas, which was sucked by the suction device from the gas discharge port, from an outside gas release port at a time of start-up of the fuel cell, and refluxes the gas, which was sucked from the gas discharge port by the suction device, to the gas supply port at a time of operation of the fuel cell.

11. A fuel cell system according to claim 10, wherein at the time of the start-up of the fuel cell and after release of the gas to the outside gas release port, the control device supplies the gas from the gas storage device into the fuel chamber.

12. A fuel cell system according to claim 10, further comprising an oxygen concentration sensor for detecting an oxygen concentration in the fuel chamber, wherein the control device judges, on the basis of an output of the oxygen concentration sensor, that release of the outside gas release port is performed.

13. A fuel cell system according to claim 12, wherein plural fuel cells are stacked, and the fuel cells are connected with each other through a separator integrally forming a gas supply port, a gas discharge port, and a gas passage for interconnecting the gas supply port and the gas discharge port.

14. A fuel cell system comprising a fuel including a fuel chamber for supplying hydrogen to a hydrogen electrode and an oxygen chamber for supplying oxygen to an oxygen electrode, wherein the fuel cell system comprises:
- a gas storage device for storing a gas containing the hydrogen;
- a gas supply port for supplying the gas into the fuel chamber;
- a gas discharge port for discharging the gas from the fuel chamber;
- a suction device for sucking the gas from the gas discharge port; and
- a control device, and
- wherein the control device releases the gas, which was sucked from the gas discharge port by the suction device, from an outside gas release port at a time of stopping of the fuel cell, and refluxes the gas, which was sucked from the gas discharge port by the suction device, to the gas supply port at a time of operation of the fuel cell.

15. A fuel cell system according to claim 14, wherein at the time of stopping of the fuel cell and after release of the gas to the outside gas release port, the control device supplies air from outside the fuel cell into the fuel chamber.

16. A fuel cell system according to claim 14, further comprising a hydrogen concentration sensor for detecting a hydrogen concentration in the fuel chamber, wherein the control device judges, on the basis of an output of the hydrogen concentration sensor, that release of the gas to the outside gas release port is performed.

17. A fuel cell system according to claim 16, wherein plural fuel cells are stacked, and the fuel cells are connected with each other through a separator integrally forming a gas supply port, a gas discharge port, and a gas passage for interconnecting the gas supply port and the gas discharge port.

18. A fuel cell system comprising a fuel cell including a fuel chamber for supplying hydrogen to a hydrogen electrode and an oxygen chamber for supplying oxygen to an oxygen electrode, wherein the fuel cell system comprises:
- a gas supply port for supplying a gas containing the hydrogen into the fuel chamber;
- a gas discharge port for discharging the gas from the fuel chamber;
- a suction device for sucking the gas from the gas discharge port;
- concentration detection means attached in the fuel chamber, for detecting a concentration of the gas in the fuel chamber; and a control device for controlling release of the gas by the suction device to an outside gas release port, on the basis of an output signal of the concentration detection means.

19. A fuel cell system according to claim 18, wherein plural fuel cells are stacked, the fuel cells are connected with each other through a separator integrally forming a gas supply port, a gas discharge port, and a gas passage for interconnecting the gas supply port and the gas discharge port, and the concentration detection means is attached to the separator.

20. A fuel cell system according to claim 19, wherein the concentration detection means is attached to the separator positioned at an end portion of the stacked fuel cells.

21. A fuel cell system according to claims 18, wherein a probe of the concentration detection means is provided in a region where the gas is apt to stagnate in the fuel chamber.

22. A fuel cell system according to claim 9, wherein a probe of the concentration detection means is provided in a region where the gas is apt to stagnate in the fuel chamber.

23. A fuel cell system according to claim 21, wherein the region where the gas is apt to stagnate is a region in the fuel chamber where the gas supply port is not directly connected to the gas discharge port.

24. A fuel cell system according to claim 23, wherein the gas can flow in plural paths in the fuel chamber.

25. A fuel cell system according to claim 21, wherein the gas can flow in plural paths in the fuel chamber.

26. A fuel cell system according to claim 24, wherein plural fuel cells are stacked, the fuel cells are connected with each other through a separator integrally forming a gas supply port, a gas discharge port, and a gas passage for interconnecting the gas supply port and the gas discharge port, and countless convex portions exist in the gas passage and the gas can flow through plural paths.

* * * * *

UNITED STATES PATENT AND TRADEMARK OFFICE
CERTIFICATE OF CORRECTION

PATENT NO. : 6,896,985 B2
DATED : May 24, 2005
INVENTOR(S) : Horiguchi et al.

It is certified that error appears in the above-identified patent and that said Letters Patent is hereby corrected as shown below:

Column 15,
Line 15, change "any one of claims 4" to -- claim 2 --;
Line 20, change "oxyqen" to -- oxygen --;

Column 16,
Line 10, after "release of" insert -- the gas to --.

Signed and Sealed this

Eighteenth Day of April, 2006

JON W. DUDAS
*Director of the United States Patent and Trademark Office*